United States Patent [19]

Genna

[11] Patent Number: 4,687,173
[45] Date of Patent: Aug. 18, 1987

[54] MECHANICAL AND ACOUSTICAL VIBRATION REDUCTION APPARATUS FOR TURNTABLES AND SPEAKER ENCLOSURES

[76] Inventor: Robert T. Genna, 41 Oakdene Ave., Cliffside Park, N.J. 07010

[21] Appl. No.: 581,199

[22] Filed: Feb. 17, 1984

[51] Int. Cl.[4] .......................................... F16M 11/00
[52] U.S. Cl. .................................... 248/603; 248/638
[58] Field of Search ............... 248/603, 610, 619, 562, 248/611, 638, 612, 613, 634, 603, 638

[56] References Cited

U.S. PATENT DOCUMENTS

| | | | |
|---|---|---|---|
| 833,068 | 10/1906 | Lloyd | 248/610 |
| 1,067,961 | 7/1913 | Bailey | 248/612 |
| 1,468,881 | 9/1923 | Lewis | 248/610 |
| 2,161,301 | 6/1939 | Lonig | 248/610 |
| 2,218,333 | 10/1940 | Frisk | 248/612 |
| 2,570,970 | 10/1951 | Murray | 248/619 |
| 3,204,911 | 9/1965 | Lawrence | 248/611 |
| 3,592,422 | 7/1971 | Paine | 248/613 |
| 4,401,342 | 8/1983 | Anderson | 248/562 |

Primary Examiner—Reinaldo P. Machado
Assistant Examiner—Alvin Chin-Shue

[57] ABSTRACT

A mechanical and acoustical isolating enclosure for turntables and isolating base for speaker enclosures. A turntable is placed on the base-plate of the apparatus which is then covered and balanced. This in turn, reduces the transmission of mechanical and acoustical vibration (foot steps, doors closing, cabinet and speaker vibration, etc.) to the turntable. It is a double steel tubing frame suspension apparatus with rectangular concentrically arranged tubing frames circular in cross-section. The inner frame hangs from the outer frame by means of synthetic rubber rings which wrap around the two tubular frames at specific balancing points, allowing them to be elastically joined. The resilient load-supporting means and energy-dissipating means are both performed by the synthetic rubber rings. If a turntable and speaker enclosure are both placed on their own separate apparatus during audio playback of a record, a very satisfactory level of vibration reduction can audibly be attained to produce a quieter and more pleasing reproduction from the original source.

2 Claims, 6 Drawing Figures

FIGURE 1
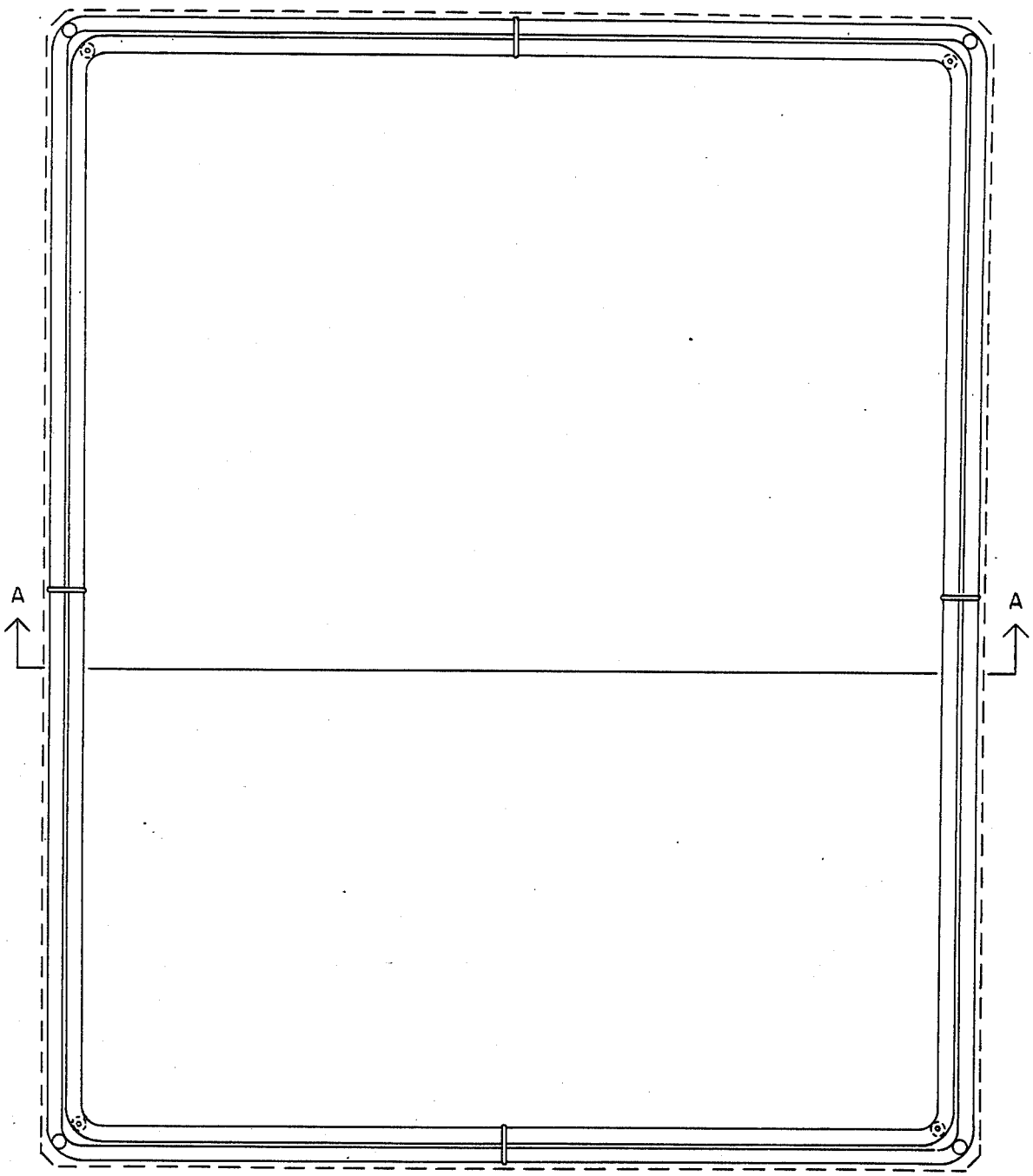
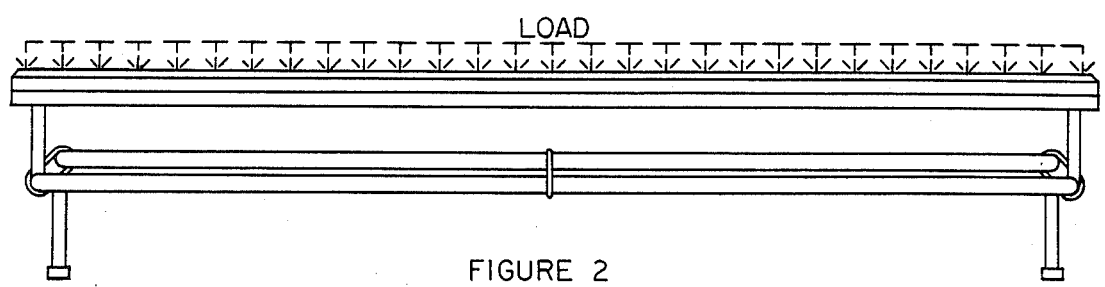
FIGURE 2

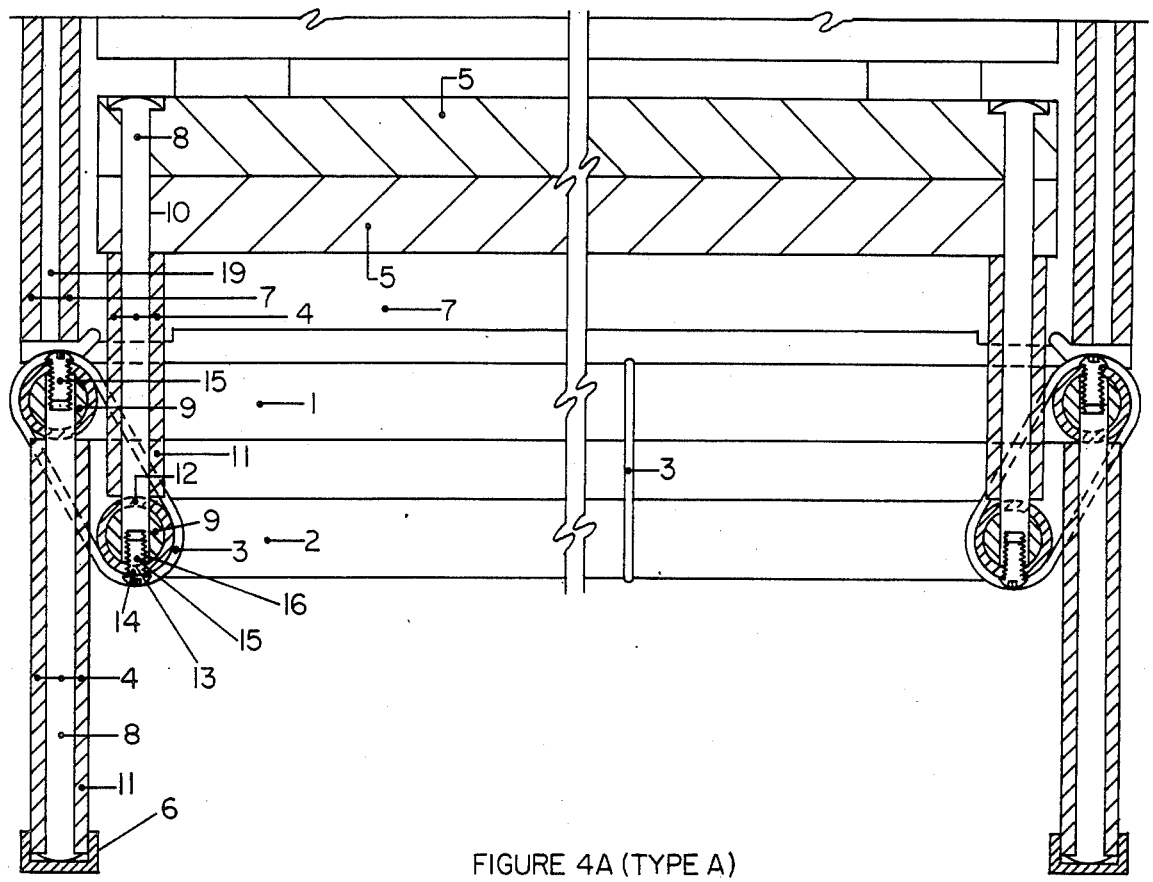
FIGURE 4A (TYPE A)
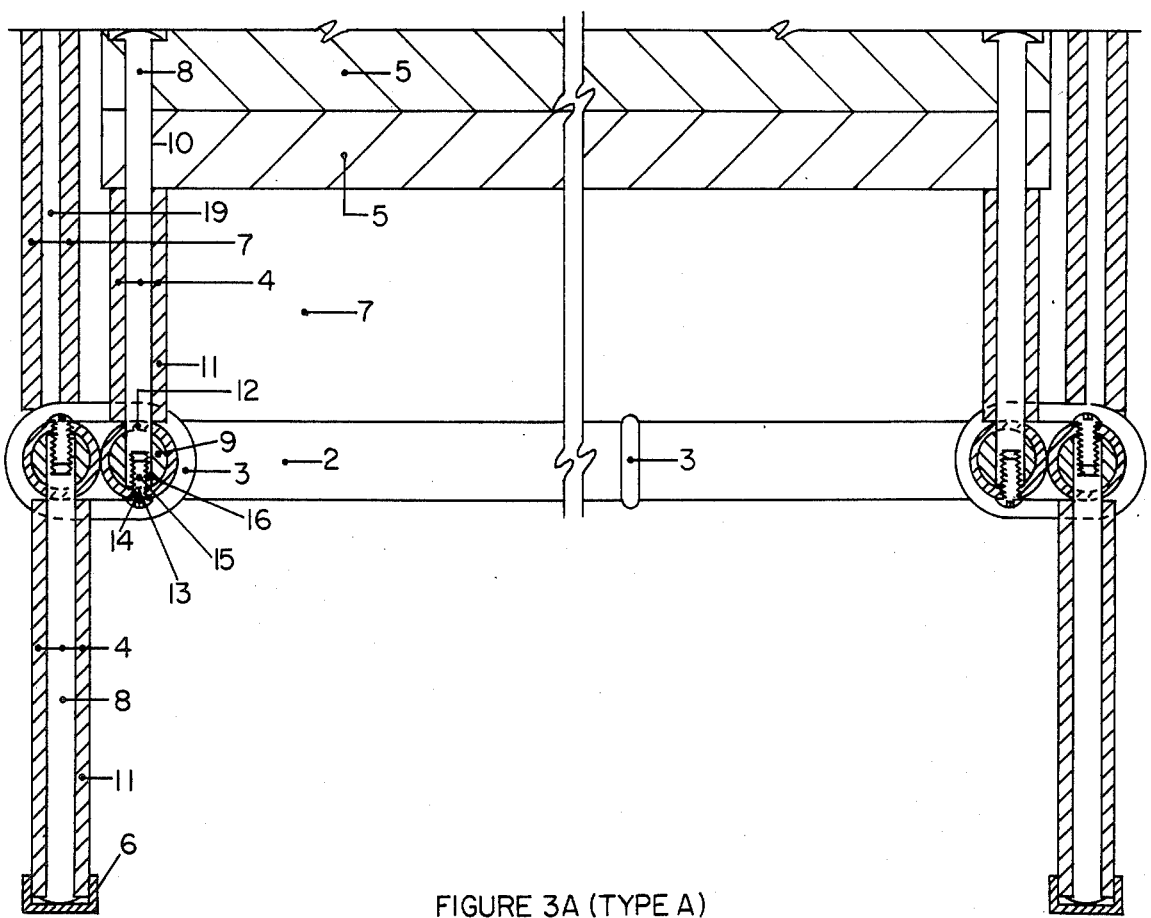
FIGURE 3A (TYPE A)

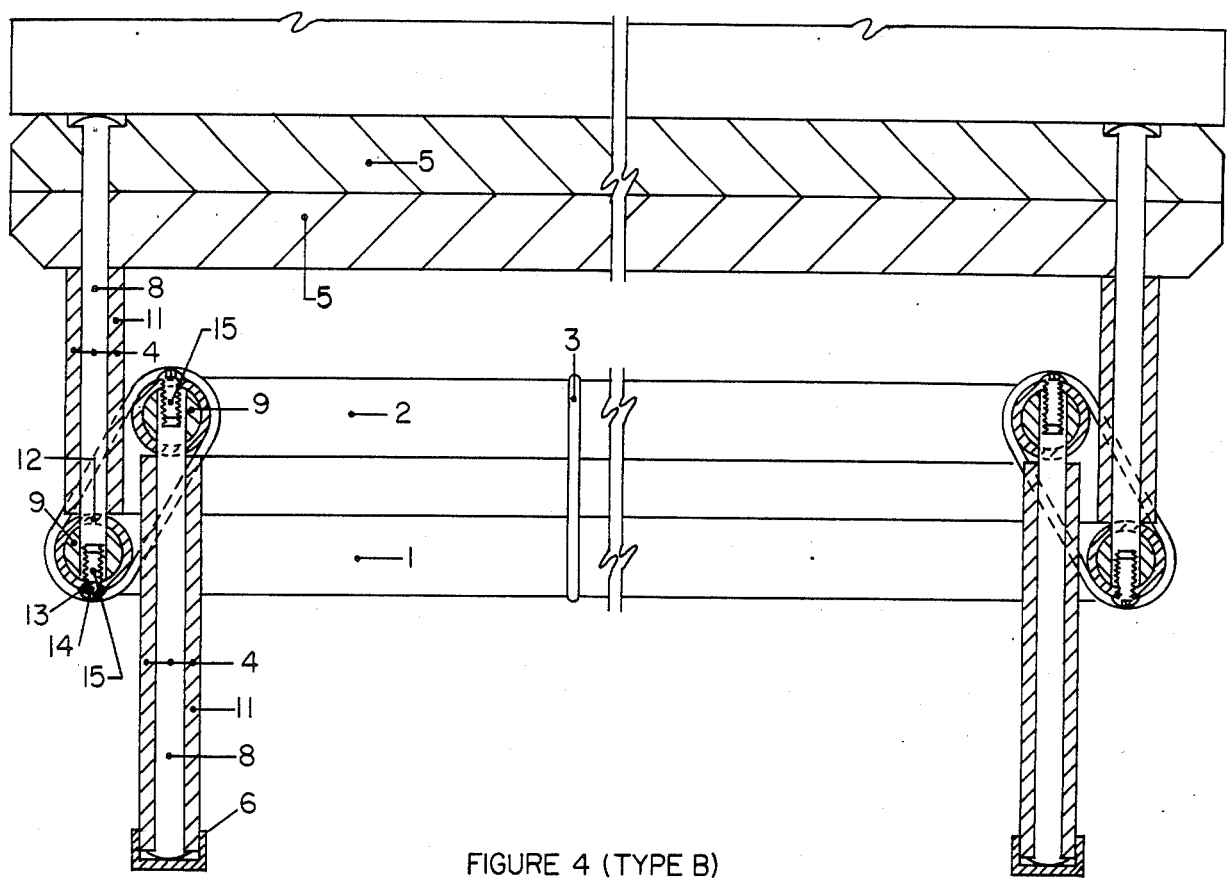
FIGURE 4 (TYPE B)
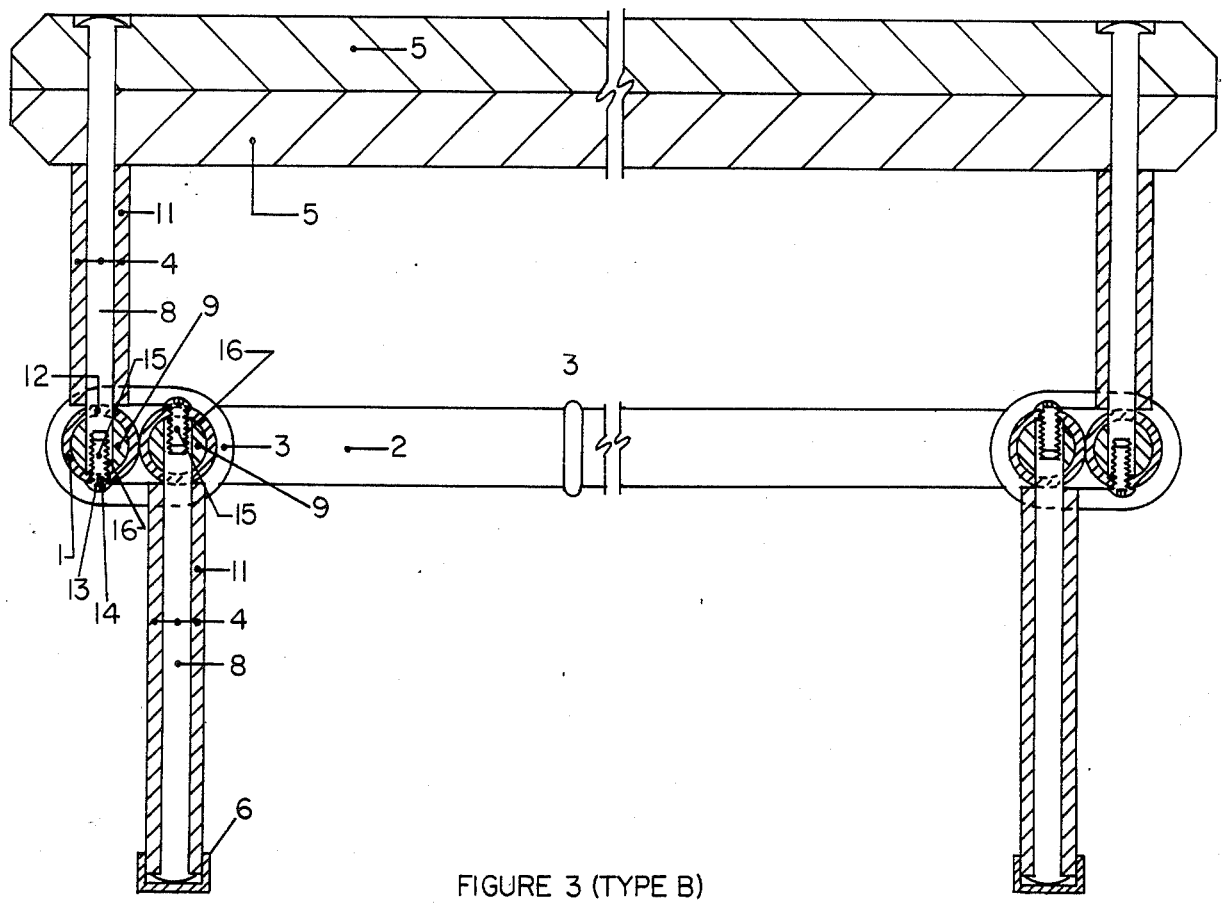
FIGURE 3 (TYPE B)

MECHANICAL AND ACOUSTICAL VIBRATION REDUCTION APPARATUS FOR TURNTABLES AND SPEAKER ENCLOSURES

SUMMARY OF THE INVENTION

1. Mechanical aspects

Sound due to vibration generated from speaker enclosures can be transmitted to the turntable via a mechanical contact (table-top, shelf, etc.) which is coupled to the room (floors, walls, ceiling). This vibration is a contribution to "muddying" of original signals from records. Super-sensetive turntables will pick this vibration up through the stylus and consequently deteriorate the original musical or spoken sound. The elastic suspension apparatus reduces direct mechanical contact between room, speaker enclosure and turntable by means of the energy-dissipating synthetic rubber rings, thereby isolating the turntable from such sound transmission and improving sound reproduction.

2. Acoustical aspects

Air vibrations due to sound emitted from speaker diaphragms can be transmitted to the turntable via an acoustical contact. The acoustical isolating enclosure reduces this type of sound transmission by acting as a double-wall plastic cover shield against airborne sound. Also since the plastic cover does not sit directly on the turntable, the acoustical energy transmitted through the air in the room strikes the plastic cover first and is re-routed to the outer tube frame where it is damped by the synthetic rubber rings.

This actually also reduces mechanically transmitted sound from the cover edge resting on the turntable due to acoustical excitation of the cover. The de-coupling of the cover from the turntable reduces the likelyhood of this problem. The air space between the doublewall of the cover acts as a buffer zone and further reduces the transmission of sound to the interior of the enclosure.

DESCRIPTION OF THE DRAWINGS

FIG. 1: Plan view of the inner and outer tube frames in their rectangular/concentric arrangement with synthetic rubber rings and vertical legs in place. Section views are indicated.

FIG. 2: Elevation of the apparatus with imaginary load showing displacement of outer tube frame base-plate and stretched synthetic rubber rings.

FIG. 3: Section A—A of apparatus in unloaded condition. Synthetic rubber rings are in their primary position. Construction details of base-plate, leg/frame connections and leg/base-plate connections are shown in a scale of two inches equals one inch.

FIG. 4: Section A—A of apparatus in loaded condition. Synthetic rubber rings are in their secondary position. Base-plate and outer frame are displaced due to the load. Construction details and scale are the same as FIG. 3.

DETAILED DESCRIPTION

My invention functions by means of two steel tubing rectangular frames, one suspended and one supported, both having a circular cross-section. Where the steel tubing is required to have an over-all diameter of one quarter inch or less, the tubing will be reinforced throughout its inside diameter with internal reinforcing rods (9). These rods are inserted in the tubing prior to its frame formation. They serve to minimize deflection at the supports as well as effectively eliminate resonances within the tube. Where the tube diameter is greater than one quarter inch the reinforcing rods (9) may be replaced with a rubber insert. This is adequate since deflection is minimized by the added stiffness of the larger tube and only the resonance eliminating insert need be supplied.

There are two types of categories into which the apparatus may fall.

Type (A) With Acoustical Isolating Enclosure (7)
Type (B) Without Acoustical Isolating Enclosure (7)

Type (A) refers to an apparatus whose inner tubing frame (2) hangs from an outer tubing frame (1) which is firmly supported in a convenient manner and consequently supports an acoustical isolating cover (7) on its upper surface. Type (A) should be used whenever an acoustical isolating cover is required (i.e. turntables).

Type (B) refers to an apparatus whose outer tubing frame (1) hangs from an inner tubing frame (2) which is firmly supported by a base (furniture, table-top, shelf, etc.). Type (B) should be used whenever no acoustical isolation is required (i.e. speaker enclosures).

In both cases the frames shown hang from synthetic rubber rings (3). The rings (3) wrap around the two tubular frames (1,2) and allow them to be elastically joined in a suspension. The rings (3) slide along the curved surface of the inner and outer tubing frames to allow balance adjustment of the apparatus. Both inner and outer frames are given adequate clearance from supporting base surface and turntable base by means of vertical legs attached at the corners of the horizontal tubing frames. These legs point upward (for turntable support) from outer tubing frame and downward (for table or shelf support) from inner tubing frame in type (B). Type (A) would be the converse of this arrangement, where upward legs attach to inner frame and downward legs to outerframe.

APPARATUS TYPE (A)

In apparatus type (A), base-plate (5) on which the turntable rests is connected to the vertical legs (4) on inner tubing frame (2) by means of a steel pin (8). The steel pin (8) is placed through a hole (10) in the corner of the base-plate (5) and is fitted into the leg sleeve spacer (11). The steel pin (8) then continues through a hole (12) in the inner tubing frame (2) and comes to rest on the inside wall (13) of said inner tubing frame (2). At the inside wall location (13) another hole (14) is made where set screw (15) is positioned and fitted through to screw into threaded hole (16) of steel pin (8). Thus rigidly connecting base-plate (5) to inner tubing frame (2) via steel pin (8), leg sleeve spacer (11) and set screw (15). The same connection procedure is used to connect the remaining three legs of inner tubing frame (2) to base-plate (5) and the other four outer tubing frame vertical legs for table-top support. Rubber caps (6) are placed over the outer tubing frame (1) vertical legs to protect furniture from abrasion. Inner tubing frame (2) is suspended to outer tubing frame (1) by means of synthetic rubber rings (3) that slide over the two frames prior to leg assembly and are positioned one on each side of the rectangular composite frame (1 & 2) comprising of four supports total per apparatus (i.e. four synthetic rubber rings per unit). The amount of weight that can be supported by each unit is given in table I. This shows the various ring sizes for various loading conditions.

TABLE I

TENSILE LOADING LIMITS FOR SYNTHETIC RUBBER RINGS (POLYURETHANE TYPE) (6000 P.S.I. MAX (BASED ON UNIFORMLY APPLIED LOAD)

| Steel Tubing Size (O.D. in.) | Ring Sizes O.D. | Ring Sizes I.D. | Wall Dia. | Maximum Load Per Ring (lbs.) @ 400% Safety Factor. (Unless Otherwise Noted*) | Total Load (lbs.) (4 Rings) | Percent of Ring Elongation/Per Ring (in.) | Tensile Strength Per Ring (P.S.I.) |
|---|---|---|---|---|---|---|---|
| 3/16" | 3/8" | 1/4" | 1/16" | 9.2 | 36.8 | 93.7%/11/16" | 1500 |
| 1/4" | 1/2" | 3/8" | 1/16" | 13.8 @ 300% S.F.* | 55.2 | 140.6/1 1/32" | 2250 |
| 5/16" | 5/8" | 7/16" | 3/32" | 20.7 | 82.9 | 93.7/1 3/16" | 1500 |
| 3/8" | 3/4" | 9/16" | 3/32" | 31.0 @ 300% S.F.* | 124.4 | 140.6/1 13/16" | 2250 |
| 7/16" | 7/8" | 5/8" | 1/8" | 36.8 | 147.8 | 93.7/1 7/8" | 1500 |
| 1/2" | 1" | 3/4" | 1/8" | 55.3 @ 300% S.F.* | 221.2 | 140.6/2 7/16" | 2250 |
| 5/8" | 1 1/4" | 7/8" | 3/16" | 82.9 | 331.4 | 93.7/2 7/8" | 1500 |
| 11/16" | 1 3/8" | 1" | 3/16" | 124.3 @ 300% S.F.* | 497.1 | 140.6/3 9/16" | 2250 |

Type (A) encompasses the addition of an acoustic vibration isolating enclosure (7) (cover) constructed of a double-walled plastic housing. Between the two walls of the housing is an air space (19) which acts as a buffer zone to acoustically transmitted waves (i.e. through air movements). These are typically generated from loudspeaker diaphragms and strike the isolating cover (7) to be absorbed by the apparatus via the energy-dissipating means performed by the synthetic rubber rings (3).

APPARATUS TYPE (B)

In apparatus type (B), a base-plate (5) on which the speaker cabinet rests is connected to the vertical legs (4) on outer tubing frame (1) by means of a steel pin (8). The construction details for connecting steel pin assembly to outer tubing frame (1) and base-plate (5) are identical to those procedures described in apparatus type (A) for this particular application of connections. The only difference being that in this case outer tubing frame (1) is hung from inner tubing frame (2) by means of synthetic rubber rings instead of vice-versa for type (A).

In apparatus type (B) the same basic principles employed in the turntable vibration reduction system for type (A) can also be translated for reducing vibration transmissions from speaker enclosure to room and turntable via a similar anti-feedback loop. Since the source of vibration in an audio system originates at the speaker enclosure and diaphragm, we can conclude that reducing the mechanical component at the speaker enclosure/room interface can be beneficial to the reproduction of music or speech at the record/stylus interface. In other words, when speaker enclosures vibrate (which theoretically they should not in an ideal case) it sends a shock wave through the room on which it rests. Decoupling this wave by means of my invention improves the sound quality at the turntable by reducing excess mechanical vibration transmission to the stylus. The resilient load-supporting means and energy-dissipating means are both performed by the synthetic rubber rings. In other types of isolators, the resilient load-carrying means may lack sufficient energy-dissipating characteristics (e.g., metal springs), then separate and distinct energy-dissipating means called dampers are employed. The synthetic rubber rings eliminate the need for such dampers by means of their dual function as a load support and an energy-dissipator.

Mechanical shock is transmitted most efficiently through a hard material. The softer the material (the lower the density) the more energy absorption takes place. So an ideal combination of softness and density could be the most practical isolator. Although for load-supporting means in tension, elasticity is an important factor. This is the ability to stretch or elongate during a stress cycle and then be able to regain the original shape by removing the stress or load. The absorptive and high tensile strength of synthetic rubber elastomers give the synthetic rubber rings a damping advantage over metal springs. Although metal springs do flex during a vibration cycle they are nevertheless rigid in their cross-section as a hard material. Mechanically induced shock will travel very quickly along the axis and surface of the metal spring unless it is properly damped. A synthetic rubber ring is superior in reducing mechanical shock transmission in the sense that it can act both as a damper and a structural support member simultaneously.

In both apparatus types (A) & (B), inner and outer tubing frames are properly bent to their required shape and are each butt-end connected by a pressure fitted steel spring cylinder (17). This ensures a strong structural connection at the seam of each frame.

In both apparatus types (A & B), base-plate (5) is a double layer platform consisting of two plates with equivalent over-all dimensions. The two plates are placed over the upward vertical legs (4) and are joined together solely by said legs (4). No adhesive is applied between the plates to allow each plate to resonate independently, thereby creating an effective negative feedback method for damping the composite platform base-plate (5).

In theory, since the plates resonate at the same frequency and are within a small tolerance and proximity of each other they tend to cancel out their mutual resonances. The composite base plate (5) is made of a very dense rubber layer and particle material whose properties reduce the initial resonance and give adequate stiffness for support. This further dampens the platform base-plate (5) vibration from either a mechanical or an acoustical source.

What is claimed is:

1. Hand balanceable mechanical and acoustical vibration reduction apparatus for vibration sensitive equipment such as turntables and vibration generating equipment such as speaker enclosures comprising:

two concentrically arranged tubing frames, elastically joined around their cross-sectional plane by synthetic rubber rings at predetermined balancing points along the perimeter of said frames;

said synthetic rubber rings being slideable along the surface of said frames allowing fine balance of said apparatus;

on corners of said frames are connected vertical legs which point upward and attach to a base support plate for equipment support on one frame and point downward for table support on another frame;

said synthetic rubber rings are stretched by the displacement of said frames due to the weight of vibration sensitive or vibration generating equipment and perform resilient load carrying and energy dissipating functions;

the ends of said vertical legs for table support have rubber caps to prevent abrasion to table surface;

an acoustical vibration reduction cover resting on the upper surface of said concentric frame with downward pointing legs for table support, encloses the upward vertical legs and frame with said equipment sensitive to vibration, isolating said equipment from air-borne sound waves.

2. Balanceable mechanical and acoustical vibration reduction apparatus by means of synthetic rubber rings as claimed in claim 1, in which:

the said slideable synthetic rubber rings achieve fine balancing of balance sensitive equipment by means of a plurality of slideable synthetic rubber rings spaced in accordance with equipment weight distribution, supporting a non-uniformly distributed mass of level sensitive equipment and compensating for non-level surfaces on which said equipment rests.

* * * * *